US010059320B2

(12) United States Patent
Potter et al.

(10) Patent No.: US 10,059,320 B2
(45) Date of Patent: Aug. 28, 2018

(54) AUTOMATIC RETAINER VALVE (71) Applicant: Westinghouse Air Brake Technologies Corporation, Wilmerding, PA (US)

(72) Inventors: William John Potter, Trafford, PA (US); Edward W. Gaughan, Greensburg, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 15/414,783

(22) Filed: Jan. 25, 2017

(65) Prior Publication Data
US 2018/0208172 A1    Jul. 26, 2018

(51) Int. Cl.
*B60T 15/54* (2006.01)
*B60T 15/18* (2006.01)
*B60T 11/28* (2006.01)

(52) U.S. Cl.
CPC .............. *B60T 15/54* (2013.01); *B60T 11/28* (2013.01); *B60T 15/184* (2013.01)

(58) Field of Classification Search
CPC ...... B60T 15/18; B60T 15/184; B60T 15/185; B60T 15/36; B60T 15/54
USPC ................................ 303/7, 8, 32, 33, 68, 69
See application file for complete search history.

(56) References Cited

U.S. PATENT DOCUMENTS

| | | |
|---|---|---|
| 2,500,555 A | 3/1950 | Majneri |
| 3,228,729 A | 1/1966 | Schubert |
| 3,232,678 A | 2/1966 | Wilson |
| 3,285,672 A | 11/1966 | Avrea |
| 3,294,455 A | 12/1966 | Valentine |
| 3,443,839 A | 5/1969 | Hinrichs et al. |
| 3,526,248 A | 9/1970 | Billeter |
| 3,713,702 A | 1/1973 | Campanini |
| 3,716,276 A | 2/1973 | Wilson et al. |
| 3,941,432 A | 3/1976 | Blanz |
| 3,994,536 A | 11/1976 | Prada |
| 4,003,605 A | 1/1977 | Fannin |
| 4,105,257 A | 8/1978 | Engle et al. |
| 4,125,294 A * | 11/1978 | Cannon ............... B60T 15/24 303/37 |
| 4,146,275 A | 3/1979 | Elliott et al. |
| RE31,386 E | 9/1983 | McEathron |
| 4,407,548 A | 10/1983 | Graham |
| 4,474,412 A | 10/1984 | Schmitt |
| 4,558,907 A | 12/1985 | Reiss et al. |
| 4,585,279 A | 4/1986 | Doto |
| 4,640,331 A | 2/1987 | Braun et al. |

(Continued)

*Primary Examiner* — Thomas J Williams
(74) *Attorney, Agent, or Firm* — The Webb Law Firm (57) ABSTRACT

An automatic retainer valve includes a body defining a piston passageway and at least one piston positioned within the piston passageway, a brake pipe and reference volume in fluid communication with a first end of the valve, a brake cylinder in fluid communication with a second end of the valve, and an exhaust port defined in the body and positioned between the first and second ends of the valve. Pressurized fluid may be vented from the brake cylinder via the exhaust port upon a brake cylinder pressure exceeding a reference volume pressure. The brake cylinder pressure may push the at least one piston towards the first end of the valve until the brake cylinder pressure equalizes with the reference volume pressure.

19 Claims, 7 Drawing Sheets

(56) References Cited

U.S. PATENT DOCUMENTS

| | | | |
|---|---|---|---|
| 4,775,194 A * | 10/1988 | Vaughn | B60T 15/54 303/74 |
| RE32,885 E | 3/1989 | Graham | |
| 4,875,739 A | 10/1989 | Hart et al. | |
| 5,083,843 A | 1/1992 | Engle | |
| 5,106,168 A | 4/1992 | McKay | |
| 5,269,595 A | 12/1993 | McKay et al. | |
| 5,429,427 A | 7/1995 | Gayfer | |
| 5,467,598 A | 11/1995 | Welscher | |
| 5,628,550 A | 5/1997 | Zaviska et al. | |
| 5,722,736 A | 3/1998 | Cook | |
| 5,785,392 A | 7/1998 | Hart | |
| 6,116,280 A | 9/2000 | Goodell | |
| 6,375,277 B1 | 4/2002 | Carroll | |
| 6,609,767 B2 | 8/2003 | Mortenson et al. | |
| 6,609,769 B2 | 8/2003 | Hart et al. | |
| 6,776,268 B2 | 8/2004 | Hart | |
| 6,971,723 B2 | 12/2005 | Engle et al. | |
| 7,306,294 B2 | 12/2007 | Hart et al. | |
| 7,556,322 B2 | 7/2009 | Veltri et al. | |
| 8,262,172 B2 | 9/2012 | Jimenez | |
| 9,333,959 B2 * | 5/2016 | Gaughan | B60T 13/266 |
| 2003/0057765 A1 | 3/2003 | Mortenson et al. | |
| 2003/0205927 A1 | 11/2003 | Kettle, Jr. | |
| 2004/0130205 A1 | 7/2004 | Wood et al. | |
| 2004/0130207 A1 | 7/2004 | Corley, Jr. | |
| 2014/0102557 A1 | 4/2014 | Call et al. | |
| 2014/0102558 A1 | 4/2014 | Call et al. | |
| 2014/0125115 A1 | 5/2014 | Gaughan et al. | |
| 2016/0046273 A1 | 2/2016 | Wright et al. | |
| 2016/0272185 A1 | 9/2016 | Gaughan et al. | |
| 2017/0080913 A1 * | 3/2017 | Goujon | B60T 15/184 |

\* cited by examiner

AUTOMATIC RETAINER VALVE

BACKGROUND OF THE INVENTION

Field of the Invention

The present disclosure is directed to retaining valves for railway cars, and more particularly, to an automatic retainer valve for a railway car.

Description of Related Art

Current brake valves have three different operating modes, including cut-in/cut-out mode, freight mode, and passenger mode. Freight trains are typically operated with the brake valve applied in freight mode. In freight mode, brake pipe pressure is charged to the desired operating pressure in a release position and reduced as the brake valve handle is moved into the "application" zone. When in the freight mode, the increase in brake pipe pressure can only be achieved by movement of the brake calve handle to the release position.

In the passenger mode, the release/charging and application manipulations are the same as in the freight mode. However, the brake pipe pressure can be incrementally increased by moving the brake valve handle towards the release position. The passenger control valves incorporate a graduated-release feature, which responds to the incremental increases in brake pipe pressure to reduce brake cylinder pressure. The freight control valves do not have this graduated-release feature. Freight control valves are direct-release valves, wherein a brake pipe pressure increase of 1.5 psi will completely release the brake application.

Current brake systems include a manually activated three position retaining valve including an exhaust position, a slow-direct position, and a high-pressure position. The exhaust position allows for venting of brake cylinder pressure to 0 psi. The slow-direct position restricts the exhaust of brake cylinder pressure or slows the rate of decrease of brake cylinder pressure to 0 psi. The high-pressure position operates to retain approximately 20 psi of brake cylinder pressure.

The manual setting of the retaining valves to the high-pressure position allows for retained brake cylinder pressure while re-charging any reservoirs to a fully charged state. This procedure may be executed to negotiate a long descending grade to increase the reserve-braking capability. The retained pressure is approximately 20 psi on each car. To vent the retained pressure, each retaining valve must be manually re-positioned to the exhaust position.

The direct release nature of the freight control valves (brake cylinder pressure based on brake pipe pressure reduction or 0 psi) requires the release of the brakes in the event that too much brake cylinder pressure is developed for a given situation. This is often referred to as a running release scenario. Following a running release, a subsequent brake application may be required to control the speed of a train before the reservoirs have been completely recharged. This is often referred to as cycle braking. Scenarios such as these may be executed when a train is negotiating undulating territory to avoid stalling the train because the reduction in brake pipe pressure is too heavy. Manipulations such as running release and cycle braking could be mitigated by setting each car's retaining valve. However, this is not practiced today in the railway car industry. The use of an automatic retainer will allow for the retaining of various levels of brake cylinder pressure without requiring a manual set/reset on each railway car.

An example of a preexisting automatic retainer valve is disclosed in U.S. Pat. No. 6,609,769 to Hart et al., incorporated herein by reference. The graduated brake release valve is used to release pressure from a brake cylinder in a graduated fashion. The graduated brake release valve can control the exhaust of the brake cylinder pressure. A metering valve portion of the graduated release valve exhaust brake cylinder pressure is generally proportional to an increase in brake pipe pressure. On one side, a graduating piston is held in position by pressure from an emergency reservoir. On an opposite side, pressure from the brake pipe and a brake cylinder exhaust pipe urge against the graduating piston. Once the brakes have been applied, if a reduction in brake cylinder pressure is desired, the brake pipe can be increased. This increase in brake pipe pressure unbalances the pressures acting on the graduating piston and causes the brake cylinder to be exhausted to atmosphere. The brake cylinder will only exhaust, however, until the brake cylinder pressure decreases proportionally to the brake pipe pressure increase. Therefore, the pressure exhausted from the brake cylinder is generally a function of the increase in brake pipe pressure. The brake cylinder is only exhausted upon the brake pipe pressure being increased. The brake cylinder does not exhaust upon a decrease in the brake pipe pressure.

Another example of a preexisting automatic retainer valve is disclosed in U.S. Pat. No. 6,971,723 to Engle et al., incorporated herein by reference. A graduating valve member is used to vent pressure from a control volume and brake cylinder to atmosphere. A valve stem of the graduating valve member is seated against a diaphragm to prevent leakage of pressure from the control volume through a central passageway provided in the valve stem. As pressure builds up in the control volume, the diaphragm is moved downward. Eventually the diaphragm is moved down so that the valve stem is no longer seated against the diaphragm. The valve assembly then will open and begin venting the control volume, as well as brake cylinder pressure, to atmosphere via the central passageway. As this venting occurs, the force urging the proportioning piston and diaphragm downward lessens at a greater rate than the brake cylinder supply pressure, until the proportioning piston moves upward to a balanced position. In this balanced position, the graduating valve member is closed. The control volume of this graduated release/proportioning valve, however, is not filled by brake pipe pressure. Further, this graduating release valve works to release pressure form the control volume upon a decrease in the brake cylinder pressure, rather than exhausting pressure from the brake cylinder upon the pressure in the brake cylinder becoming greater than the control volume pressure.

SUMMARY OF THE INVENTION

As will be appreciated from the foregoing, existing retainer valves do not use an increase in brake cylinder pressure compared to the brake pipe pressure to exhaust brake cylinder pressure. Existing retainer valves are not designed to retain brake cylinder pressure by exhausting a predetermined amount of brake cylinder pressure upon the brake cylinder pressure exceeding the brake pipe pressure. In view of the foregoing, a need exists to provide an automatic retainer valve that automatically retains brake cylinder pressure upon a reduction in brake pipe pressure. An additional need exists to provide an automatic retainer valve that retains brake cylinder pressure based upon a decrease in a predetermined amount of pressure.

In one embodiment of the disclosure, an automatic retainer valve is provided. The automatic retainer valve includes a body defining a piston passageway and at least one piston positioned within the piston passageway, a brake pipe and reference volume in fluid communication with a first end of the valve, a brake cylinder in fluid communication with a second end of the valve, and an exhaust port defined in the body and positioned between the first and second ends of the valve. Pressurized fluid may be vented from the brake cylinder via the exhaust port upon a brake cylinder pressure exceeding a reference volume pressure. The brake cylinder pressure pushes the at least one piston towards the first end of the valve until the brake cylinder pressure equalizes with the reference volume pressure.

The reference volume may be filled with pressurized fluid via the brake cylinder. A biasing member may be positioned in the second end of the valve. The biasing member may be biased towards the first end of the valve. The biasing member may be a spring. The reference volume may be isolated from the brake pipe upon the brake cylinder becoming fully-pressurized with pressurized fluid. The reference volume may be reset upon a full release of brake pipe pressure. After a full release of the brake pipe pressure, the brake pipe pressure may be brought to a minimum application pressure. The brake pipe may also be in fluid communication with the brake cylinder. The brake pipe pressure may be used to maintain a maximum brake cylinder pressure. The brake cylinder may be fully vented upon the brake pipe pressure increasing to within a predetermined pressure relative to the reference volume pressure. The pre-determined pressure is 3 psi.

In another embodiment, an automatic retainer valve arrangement is provided. The automatic retainer valve arrangement includes an automatic retainer valve including a body defining a piston passageway and at least one piston positioned within the piston passageway, and an exhaust port defined in the body and positioned between the first and second ends of the valve, a reference volume in fluid communication with a first end of the automatic retainer valve, a brake pipe in fluid communication with the first end of the automatic retainer valve, a brake cylinder in fluid communication with a second end of the automatic retainer valve, a retainer cavity in fluid communication with the automatic retainer valve, and an isolation valve in fluid communication with the retainer cavity and the brake cylinder. Pressurized fluid may be vented from the automatic retainer valve via the exhaust port upon a brake cylinder pressure exceeding a reference volume pressure. The brake cylinder pressure may push the at least one piston towards the first end of the valve until the brake cylinder pressure equalizes with the reference volume pressure.

A first check valve may be positioned in fluid communication with the retainer cavity and the brake cylinder. A biasing member may be positioned in the second end of the valve. The biasing member may be biased towards a first end of the valve. The biasing member may be a spring. The reference volume may be isolated from the brake pipe upon the brake cylinder becoming fully-pressurized with pressurized fluid. The isolation valve may be closed off by the pressurized fluid of the brake cylinder. A pressure differential may be established in the isolation valve between pressurized fluid exhausted from the retainer cavity and a biasing member. The pressurized fluid exhausted from the retainer cavity may be retained in the isolation valve until the pressurized fluid exhausted from the retainer cavity exceeds a force greater than the force exerted by the biasing member. The brake pipe may also be in fluid communication with the brake cylinder. The brake pipe pressure may be used to maintain a maximum brake cylinder pressure. A second check valve may be positioned in line between the brake cylinder and the retainer cavity.

In yet another embodiment, a method of automatically retaining pressurized fluid in a railway vehicle is provided. The method of automatically retaining pressurized fluid in a railway vehicle includes the steps of providing an automatic retainer valve arrangement, including an automatic retainer valve in fluid communication with a brake cylinder, a retainer cavity in fluid communication with the automatic retainer valve, and an isolation valve in fluid communication with the retainer cavity; filling the brake cylinder with pressurized fluid; venting pressurized fluid from the automatic retainer via the exhaust port upon a brake cylinder pressure exceeding a reference volume pressure in the automatic retainer; and retaining the exhausted pressurized fluid from the automatic retainer valve in the retainer cavity. The method may include the further steps of providing a check valve positioned in line between the retainer cavity and the brake cylinder; and directing the exhausted pressurized fluid from the automatic retainer valve to the brake cylinder via the retainer cavity and check valve.

These and other features and characteristics of the automatic retainer valve, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the disclosure. As used in the specification and claims, the singular form of "a", "an", and "the" include plural referents unless the context clearly dictates otherwise.

DESCRIPTION OF THE DISCLOSURE

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to the drawings in which like reference characters refer to like parts throughout the several views thereof, the present disclosure is generally directed to an automatic retainer valve for use with a railway car to retain brake cylinder pressure during use of the railway car's brake system.

Referring initially to FIGS. 1-8, an embodiment of an automatic retainer valve 2 is shown. Automatic retainer valve 2, as described herein, is intended for use in the brake system of a railway car, as will be readily apparent to those skilled in the rail vehicle art. Automatic retainer valve 2 is adapted for use in railway vehicles used for passenger and/or cargo transit. However, this use is intended to be non-limiting and automatic retainer valve 2 has applications in railway cars generally. Automatic retainer valve 2 in the depicted embodiment generally includes a main body 4, a top cover 6, and a bottom cover 8. In this embodiment, automatic retainer valve 2 is substantially rectangular. A plurality of fasteners 10a-h may be used to couple main body 4 to top cover 6 and bottom cover 8. It is also contemplated that main body 4, top cover 6, and bottom cover 8 may be formed as one monolithic structure, with a suitable way provided to gain access to the interior of the automatic retainer valve 2. A piston passageway 12 is defined in main body 4 and extends longitudinally from a top surface 5a of main body 4 to a bottom surface 5b of main body 4. In one embodiment, piston passageway 12 may be substantially cylindrical.

Top cover 6 includes an emergency reservoir opening 14 defined in a top surface of top cover 6. A first brake pipe opening 16 may be defined in one side of main body 4. A second brake pipe opening 20 and a retainer opening 22 may be defined in an opposing side of main body 4. A brake cylinder opening 18 may be defined in one side of bottom cover 8. In one embodiment, first brake pipe opening 16 and brake cylinder opening 18 may be positioned on the same side of automatic retainer valve 2. An exhaust opening 24 may be included on a back side of main body 4.

In one embodiment, an emergency reservoir 26 may be in fluid communication with automatic retainer valve 2 via emergency reservoir opening 14. Emergency reservoir 26 may be used to fill a reference volume 28 with pressurized fluid. Reference volume 28 may be defined in top cover 6 and may be in fluid communication with piston passageway 12 via top surface 5a of main body 4. A first brake pipe 30 of the railway vehicle may be in fluid communication with automatic retainer valve 2 via first brake pipe opening 16. Pressurized fluid may be supplied to automatic retainer valve 2 from first brake pipe 30 via first brake pipe passage 32 defined in main body 4. A brake cylinder 34 may be in fluid communication with automatic retainer valve 2 via brake cylinder opening 18. Pressurized fluid may be supplied to automatic retainer valve 2 from brake cylinder 34 via a brake cylinder passage 36. A retainer cavity 38 may be in fluid communication with automatic retainer valve 2 via retainer opening 22. Pressurized fluid may be vented from automatic retainer valve 2 via retainer passage 40. A second brake pipe 42 may be in fluid communication with automatic retainer valve 2 via second brake pipe opening 20. Pressurized fluid may be supplied to automatic retainer valve 2 from second brake pipe 42 via a second brake pipe passage 44. Emergency reservoir 26, first brake pipe 30, brake cylinder 34, retainer cavity 38, and second brake pipe 42 may be welded onto, screwed into, or fastened via a flange to automatic retainer valve 2, among other methods of connection that are readily apparent to one of skill in the art. Exhaust opening 24 may be in fluid communication with piston passageway 12 via exhaust passage 48.

Figure 1:
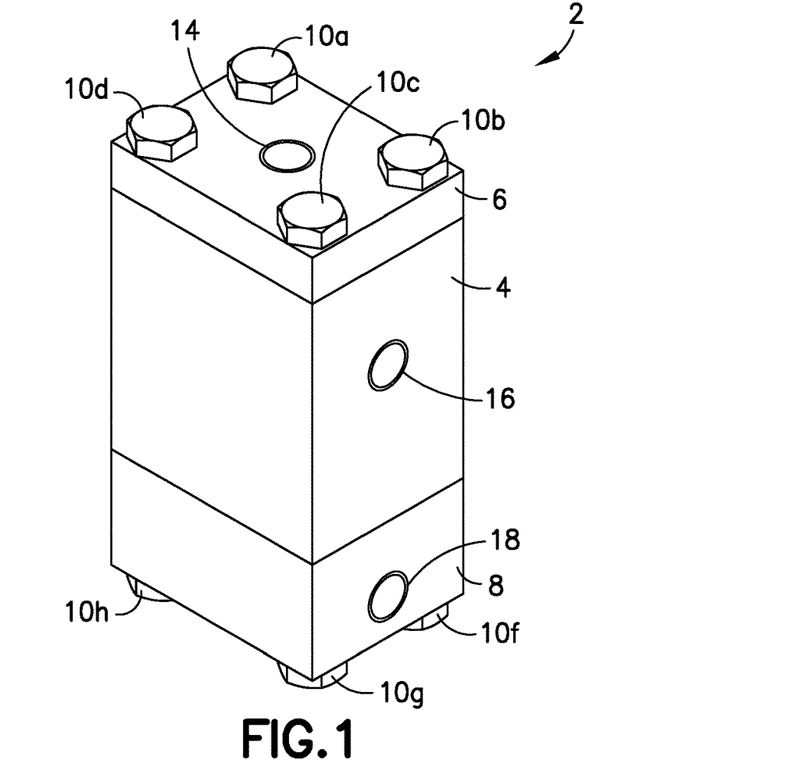
FIG. 1 is a front perspective view of an automatic retainer valve in accordance with one embodiment of this disclosure.
Figure 2:
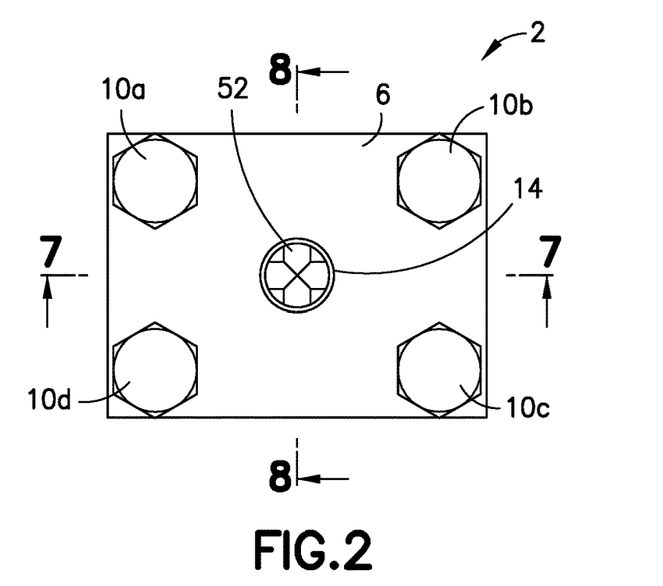
FIG. 2 is a top view of the automatic retainer valve of FIG. 1.
Figure 3:
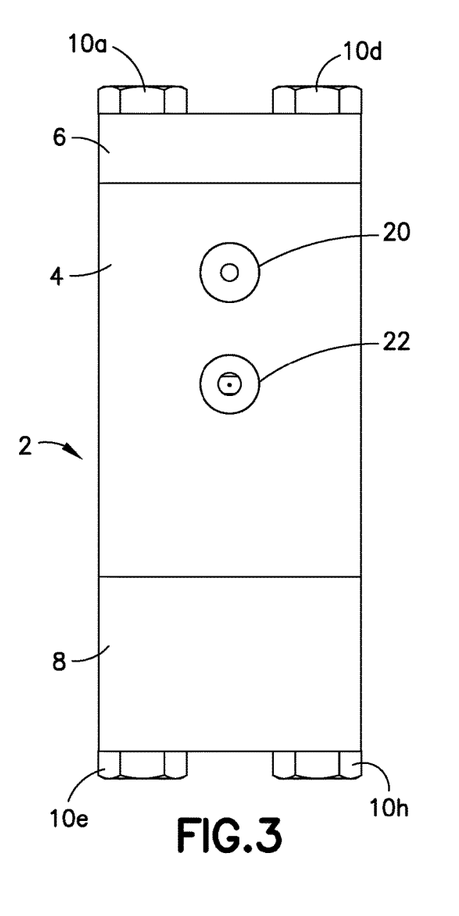
FIG. 3 is a side view of the automatic retainer valve of FIG. 1.
Figure 4:
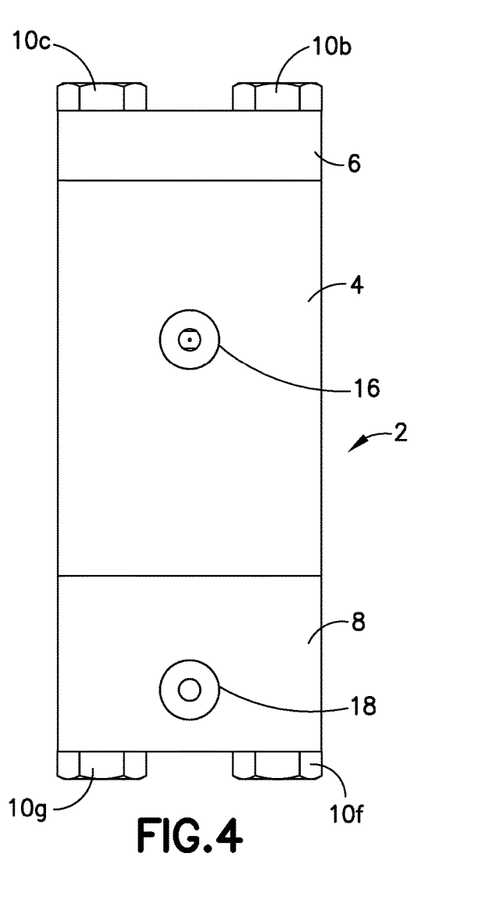
FIG. 4 is the opposing side view of the automatic retainer valve of FIG. 1.
Figure 5:
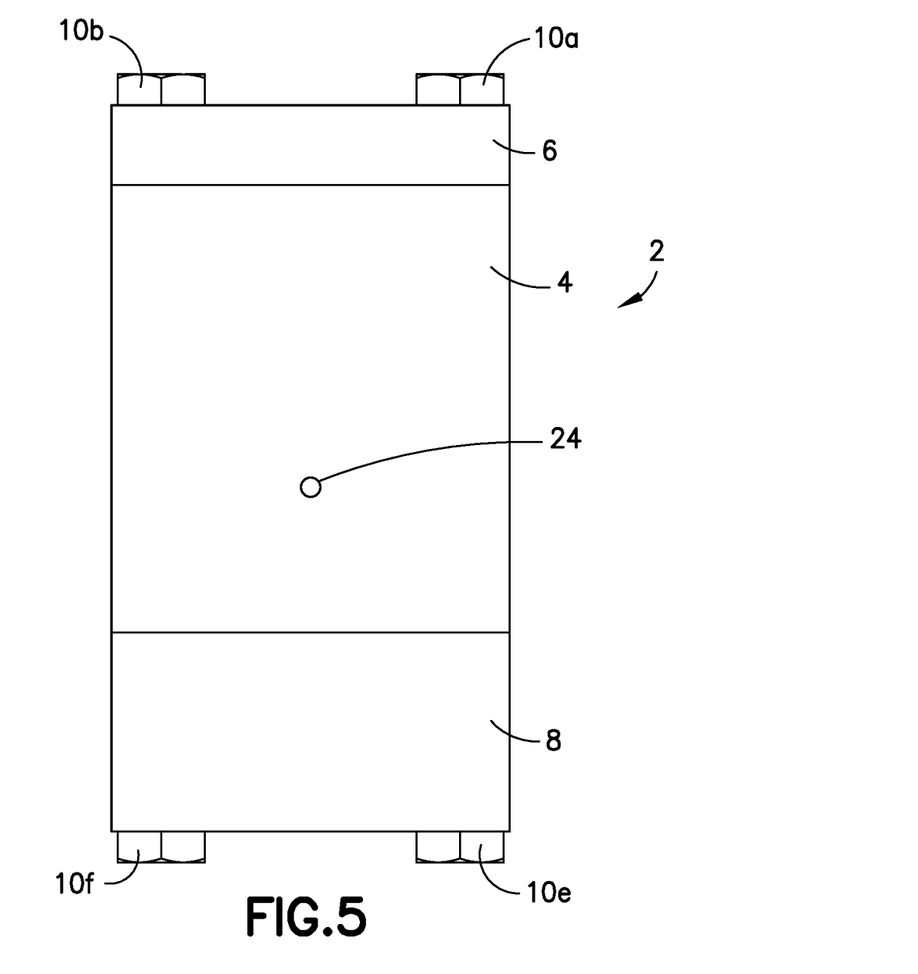
FIG. 5 is a rear view of the automatic retainer valve of FIG. 1.
Figure 6:
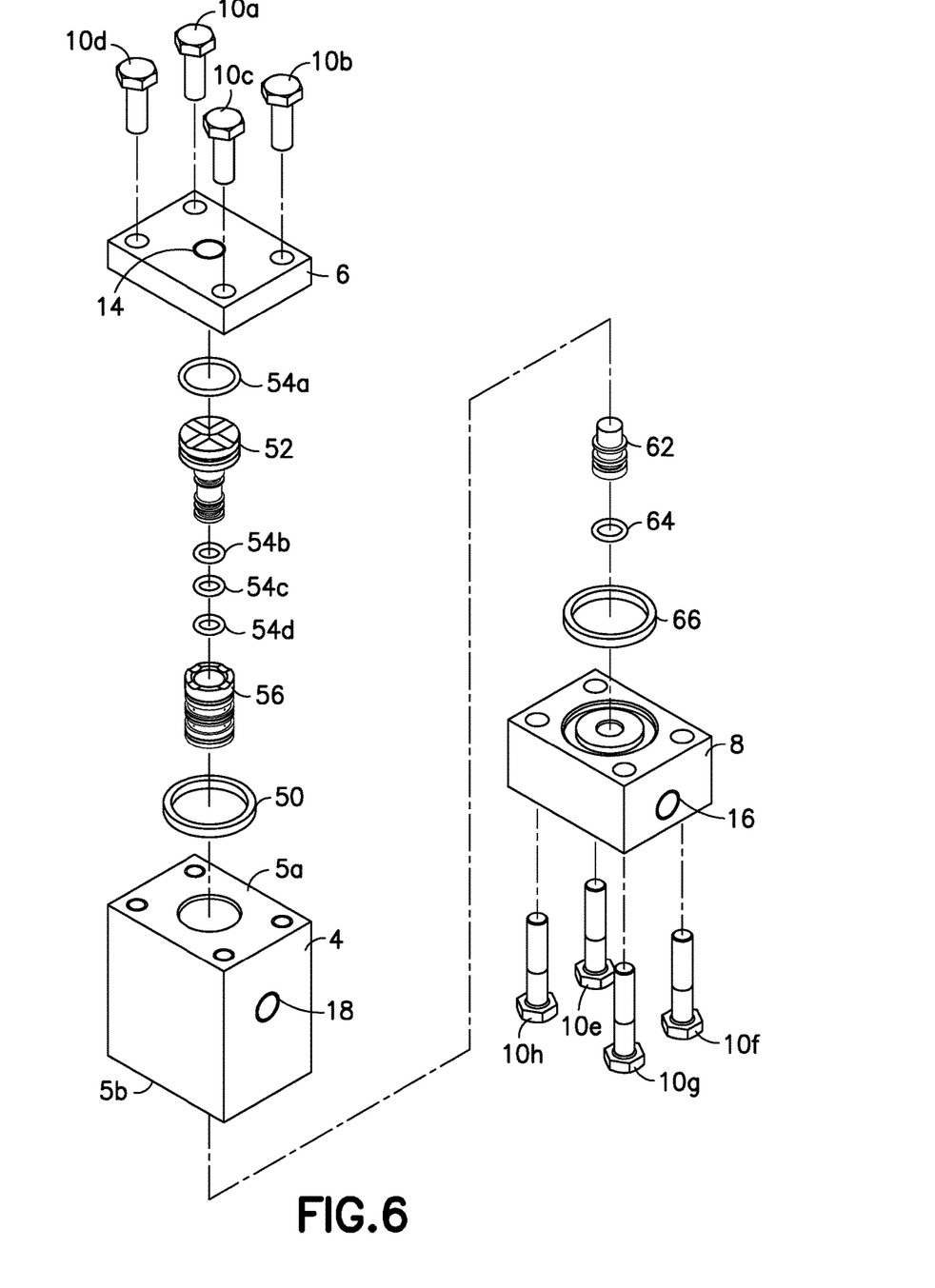
FIG. 6 is an exploded view showing the components of the automatic retainer valve of FIG. 1.
Figure 7:
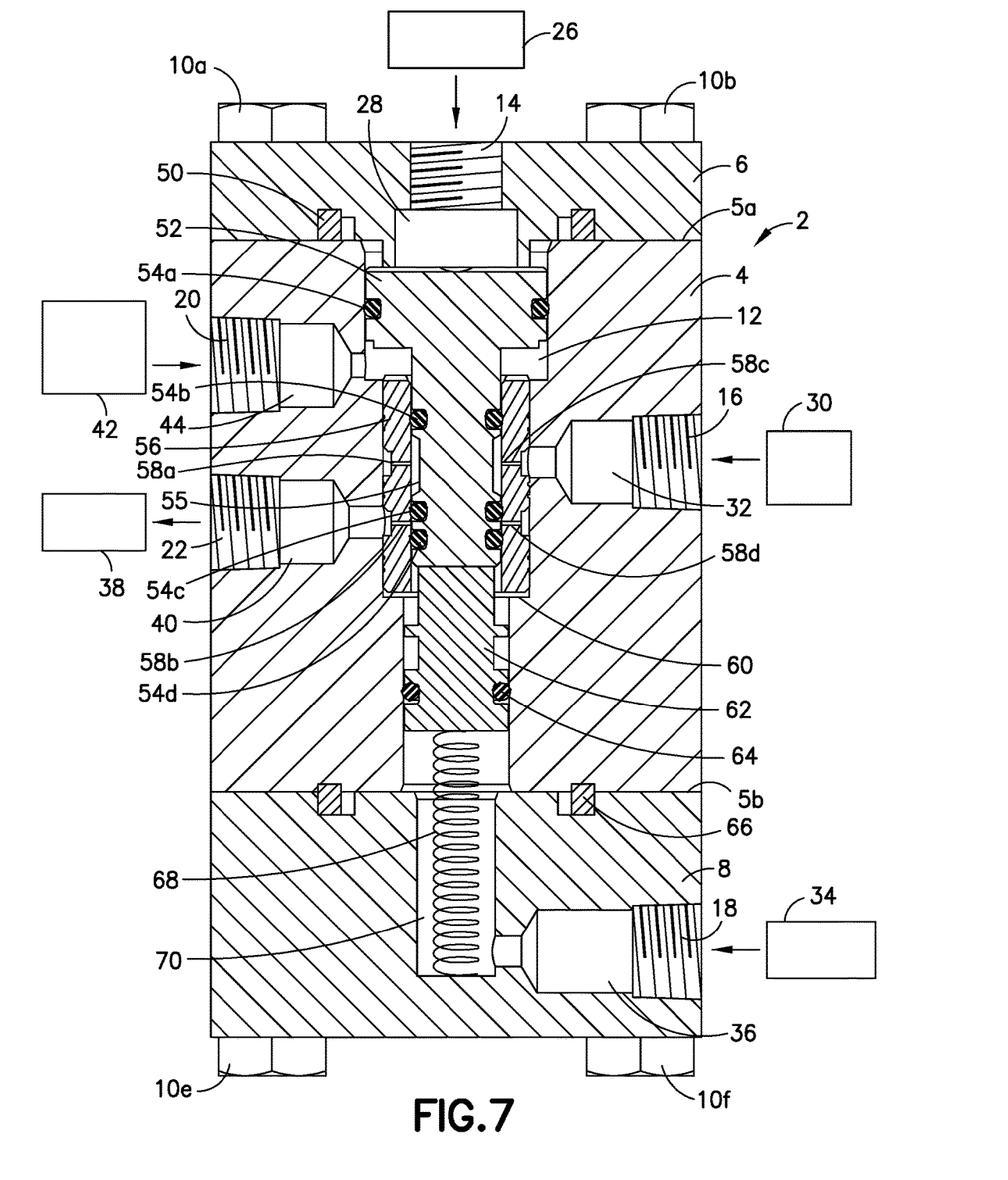
FIG. 7 is a cross-sectional view of the automatic retainer valve of FIG. 1 along line 7-7 in FIG. 2.
Figure 8:
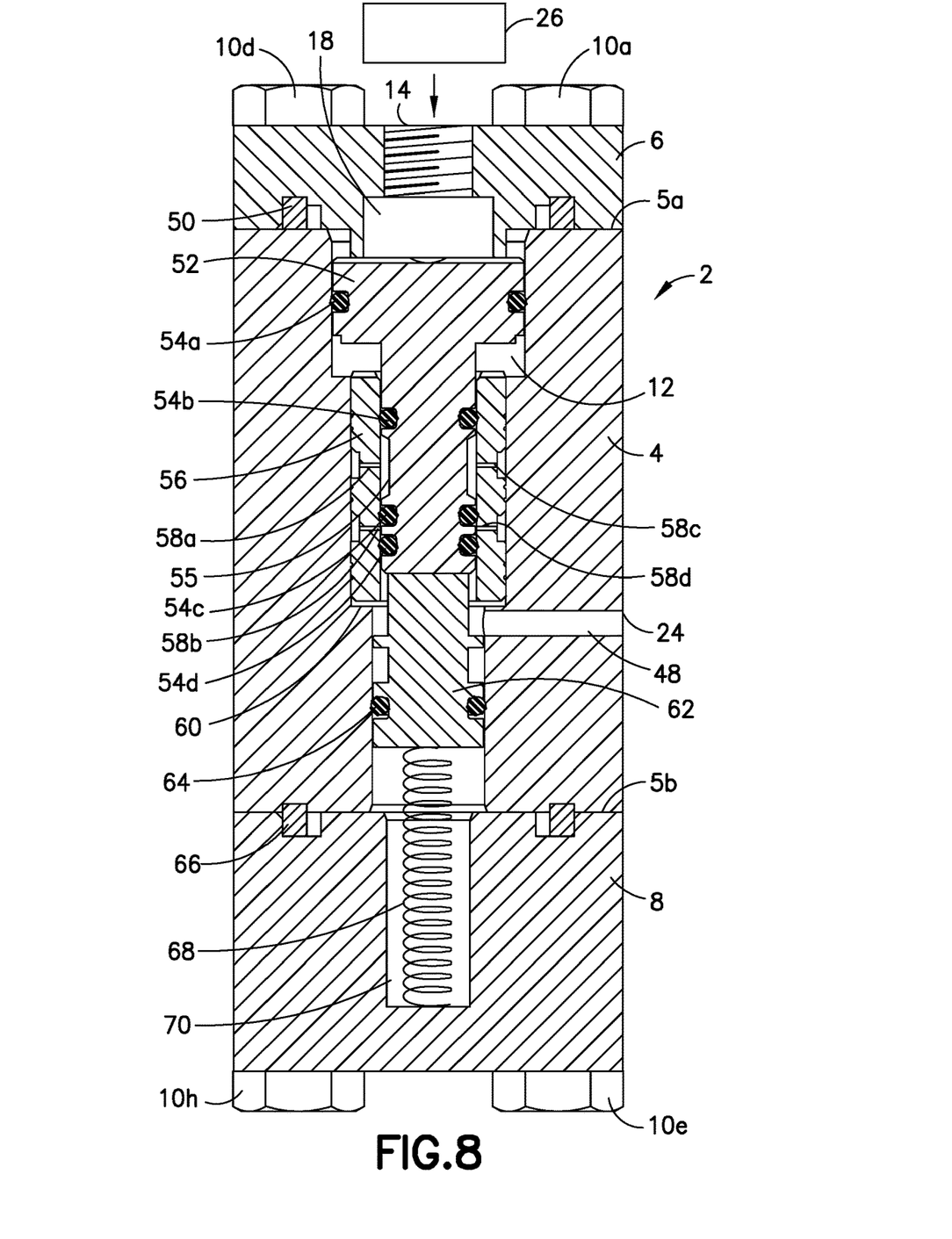
FIG. 8 is another cross-sectional view of the automatic retainer valve of FIG. 1 along the line 8-8.
Figure 9:
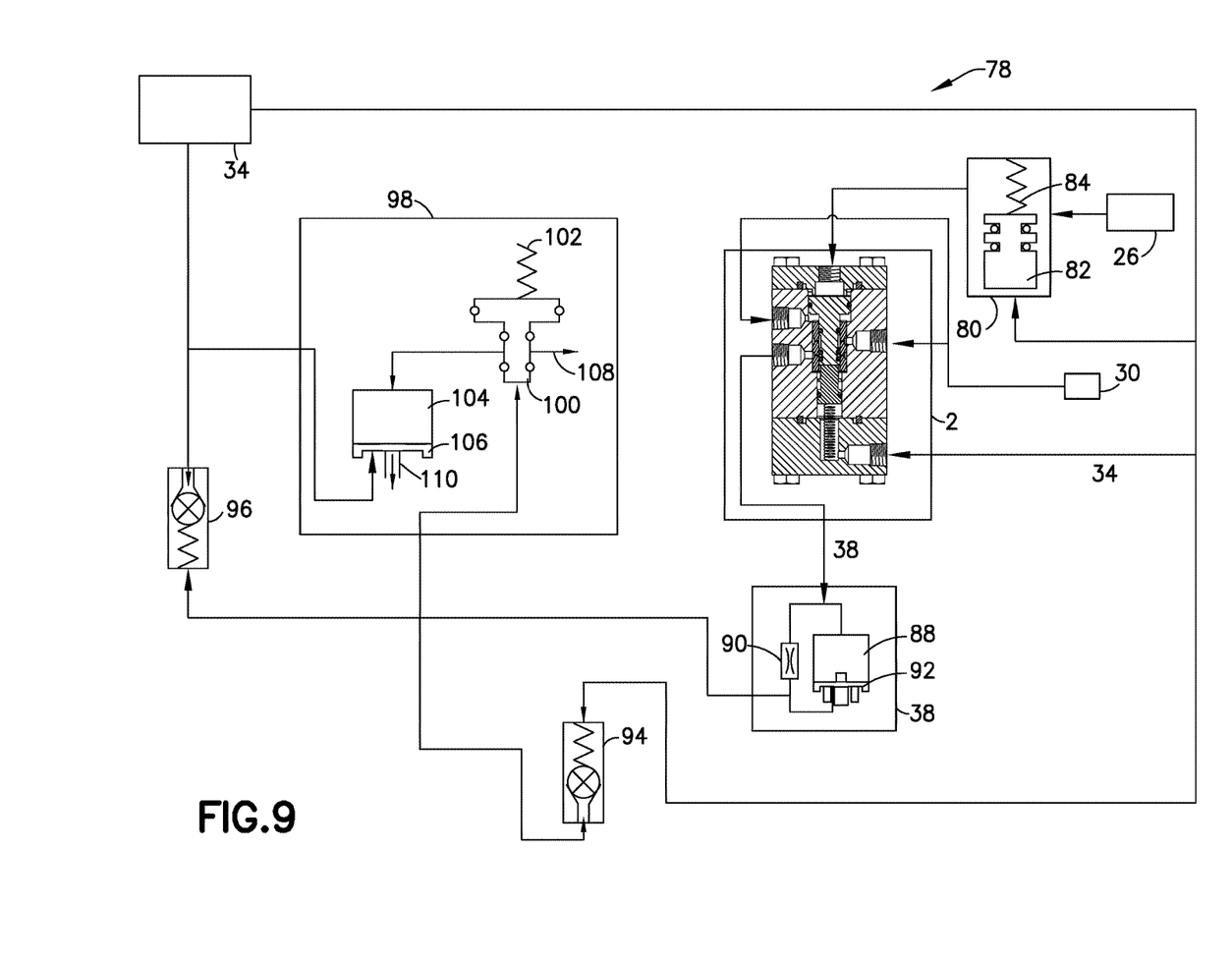
FIG. 9 is a schematic drawing of an automatic retainer valve arrangement in accordance with this disclosure.

Referring to FIGS. 7-9, in one embodiment automatic retainer valve 2 includes several components for maintaining a predetermined pressure in brake cylinder 34. A method of maintaining pressure in brake cylinder 34 is described in more detail hereinbelow. A first gasket 50 may be provided in a cavity defined in a bottom surface of top cover 6. First gasket 50 may be used to provide a seal between top cover 6 and main body 4, thereby preventing leakage of pressurized fluid from automatic retainer valve 2.

A first piston 52 may be positioned in an upper portion of piston passageway 12. First piston 52 may be longitudinally slidable within piston passageway 12. First piston 52 may be T-shaped, with an upper portion of first piston 52 contacting a circumferential inner surface of piston passageway 12. A plurality of circumferential notches may be defined in the outer surface of first piston 52. The notches may be provided at different positions longitudinally along first piston 52. A plurality of O-rings 54a, 54b, 54c, 54d may be positioned in the notches defined in first piston 52. O-rings 54a, 54b, 54c, 54d are provided to prevent leakage of pressurized fluid from piston passageway 12 and automatic retainer valve 2. Although four O-rings are shown in connection with first piston 52, it is to be understood that more or less O-rings may be provided to create a tighter seal between first piston 52 and piston passageway 12.

A lower portion of first piston 52 may be positioned within a bushing 56. Bushing 56 may be cylindrical in shape and slidable within piston passageway 12. Bushing 56 may enclose the lower portion of first piston 52. A plurality of bushing passageways 58a, 58b, 58c, 58d may be defined in bushing 56. Bushing passageways 58a, 58b, 58c, 58d permit pressurized fluid to pass through bushing 56. Although four bushing passageways are shown in connection with bushing 56, it is to be understood that more or less bushing passageways may be provided to more efficiently allow pressurized fluid to pass through bushing 56. A seat 60 is provided in piston passageway 12 to restrict the downward movement of bushing 56. Upon bushing 56 resting against seat 60, downward movement of bushing 56 in piston passageway 12 is restricted.

A second piston 62 may be positioned in a lower portion of piston passageway 12. Second piston 62 may be slidable longitudinally along piston passageway 12. A top surface of second piston 62 may abut a bottom surface of first piston 52. Similar to first piston 52, second piston 62 may include a plurality of circumferential notches defined longitudinally along second piston 62, including notch 55. In one embodiment, an O-ring 64 may be positioned in one of the notches to create a seal between second piston 62 and piston passageway 12, thereby preventing the leakage of pressurized fluid from automatic retainer valve 2. Although one O-ring is shown positioned on second piston 62, it is to be understood that more O-rings may be used to provide a tighter seal between second piston 62 and piston passageway 12.

A second gasket 66 may be provided in a cavity defined in a top surface of bottom cover 8. Second gasket 66 may be used to provide a seal between bottom cover 8 and main body 4, thereby preventing leakage of pressurized fluid from automatic retainer valve 2. In one embodiment, a biasing member 68 may be provided in a passage 70 provided in bottom cover 8. Passage 70 may be in fluid communication with piston passageway 12 and brake cylinder passage 36. Biasing member 68 may rest on a bottom surface of passage 70, extend into piston passageway 12, and abut against the bottom surface of second piston 62. In one embodiment, biasing member 68 is a spring. However, it is contemplated that alternative biasing members may be used that provide a resilient member that may be compressed and expanded. In one embodiment, biasing member 68 may be biased towards the upper portion of piston passageway 12, thereby providing a biasing force against the bottom surface of second piston 62. It is also contemplated that automatic retainer valve 2 is operable without biasing member 68.

Referring to FIG. 9, an automatic retainer system 78 is shown. A description of the operation and method of using this system is described hereinbelow. The system 78 includes automatic retainer valve 2 in fluid communication with brake cylinder 34 and retainer cavity 38. Retainer cavity 38 is in fluid communication with two check valves 94, 96 and an isolation valve 98. Check valves 94, 96 may be in fluid communication with brake cylinder 34. Isolation valve 98 may also be in fluid communication with brake cylinder 34. As shown in FIG. 9, retainer cavity 38 may include a passage 88, choke 90, and diaphragm 92. Choke 90 may be used to restrict the passage of pressurized fluid through retainer cavity 38. Check valves 94, 96 may include a pressure differential between brake cylinder 34 and the pressurized fluid from retainer cavity 38. In one embodiment, check valves 94, 96 may be ball-type check valves. It is to be understood, however, that additional types of check valves may be used in place of the ball-type check valves. Isolation valve 98 includes a first piston 100, biasing member 102, exhaust chamber 104, diaphragm 106, and exhaust passageways 108, 110. A pressure differential may be established between biasing member 102 and an upward force exerted on piston 100 via pressurized fluid from retainer cavity 38. Another pressure differential may also be established between exhaust chamber 104 and an upward force exerted on diaphragm 106 by the pressurized fluid from brake cylinder 34.

A method of using an automatic retainer valve and system to retain brake pipe pressure for a brake system of a railway vehicle is described hereinbelow. As previously discussed, by using automatic retainer valve 2 on a railway vehicle, brake cylinder pressure may be retained upon a partial increase in the brake pipe pressure, thereby avoiding the need to fully release the brake cylinder pressure as well.

With reference to FIGS. 7 and 9, during the use of this method, emergency reservoir 26 may supply pressurized fluid to reference volume 28 via emergency reservoir opening 14. Reference volume 28 may be pressurized to a predetermined reference pressure. The pressurized fluid exerts a downward force on first piston 52, which in turn provides a downward force on second piston 62. First brake pipe 30 and second brake pipe 42 may supply pressurized fluid to piston passageway 12 to apply an upward force on first piston 52. A pressure differential is therefore established between the downward force exerted by the pressurized fluid of reference volume 28 and the upward force exerted by the pressure supplied by first brake pipe 30 and second brake pipe 42. Second brake pipe 42 supplies pressurized fluid to piston passageway 12. Brake cylinder 34 supplies pressurized fluid to passage 70, thereby exerting an upward force on second piston 62 and, in turn, first piston 52 corresponding to the brake cylinder 34 pressure. Biasing member 68 may also exert an upward force on second piston 62. In this embodiment, the pressure differential established includes a downward force exerted by the pressurized fluid supplied by emergency reservoir 26 and the upward force exerted by first brake pipe 30, second brake pipe 42, biasing member 68, and brake cylinder 34. The automatic retainer valve 2 is positioned in a lap position whenever the opposing forces on the pressure differential are substantially equal. In this situation, bushing passageway 58b, which leads to retaining check valve passage 40, is closed off by an outer surface of first piston 52.

During operation of the railway vehicle, the release of the brakes may be required in the event that too much brake cylinder 34 pressure has developed. A subsequent brake application may be required to control the speed of the railway vehicle before the reservoirs of the railway vehicle have been completely recharged. These situations may occur when a train is negotiating undulating territory to avoid stalling the railway vehicle because of a large brake pipe reduction. The automatic retainer valve 2 allows for retaining various levels of brake cylinder 34 pressure without requiring a manual set/re-set on each railway car. During this operation, the brake pipe pressure is brought to a minimum application pressure. The minimum application pressure is the minimum amount of pressure necessary to operate the braking system of the railway vehicle. In this operation, reference volume 28 is pressurized to a reference pressure by emergency reservoir 26. Reference volume 28 is cut-off or isolated when brake cylinder 34 is developed. Upon reaching a predetermined amount of pressure, the pressure of brake cylinder 34 exerts an upward force on reference volume isolation valve 80. The upward force exerted on piston 82 of the reference volume isolation valve 80 is greater than the downward force exerted by biasing member 84, thereby isolating emergency reservoir 26 from reference volume 28. Upon each full release of the brakes of the railway vehicle, the reference volume 28 pressure is reset via emergency reservoir 26.

As the brakes of the railway vehicle are applied, the pressurized fluid supplied via first brake pipe 30 and second brake pipe 42 is reduced and is used to maintain a maximum brake cylinder pressure. The maximum brake cylinder pressure is the maximum amount of pressure that the brake cylinder 34 can hold at safe conditions. In this situation, the pressure differential in the automatic retainer valve 2 is unbalanced and reference volume 28 pushes first piston 52 downward due to the decrease in the upward force exerted by first brake pipe 30 and second brake pipe 42. As first piston 52 is moved downward, notch 55 is moved downward in piston passageway 12. As notch 55 moves downward, pressurized fluid from first brake pipe 30 is vented to retainer cavity 38 from first brake pipe passage 32 through bushing passageway 58c through piston passageway 12 and notch 55 through bushing passageway 58b and through retainer cavity passage 40. The pressurized fluid from first brake pipe 30 is not vented to atmosphere, but is "bottled" via retainer cavity 38. The pressurized fluid from first brake pipe 30 is directed to passage 88 of retainer cavity 38. Pressurized fluid is also directed through choke 90, which slows the velocity of the pressurized fluid so that passage 88 is filled with pressurized fluid before the pressurized fluid is directed elsewhere in the brake system. After passing through choke 90, pressurized fluid is also directed to the bottom surface of diaphragm 92 of retainer cavity 38. A pressure differential is established between the pressurized fluid in passage 88 and the pressurized fluid pushing up on diaphragm 92. The pressurized fluid is also directed to check valve 94. A pressure differential is established between the downward force of pressurized fluid from brake cylinder 34 and the upward force of pressurized fluid from retainer cavity 38. Upon retainer cavity 38 pressure overcoming the brake cylinder 34 pressure, the retainer cavity 38 pressure may open check valve 94 to direct pressurized fluid into brake cylinder 34, thereby maintaining the pressure of brake cylinder 34.

Pressurized fluid from retainer cavity 38 may also be directed to check valve 96. A pressure differential is established between the downward force of the pressurized fluid from brake cylinder 34 and the upward force of the pressurized fluid from retainer cavity 38. Similar to check valve 94, once the retainer cavity 38 pressure is greater than brake cylinder 34 pressure, the retainer cavity 38 pressure opens check valve 96 to direct pressurized fluid into brake cylinder 34.

Pressurized fluid from retainer cavity 38 may also be directed to isolation valve 98. The pressurized fluid exerts an upward force on piston 100. A pressure differential is established between the upward force of the pressurized fluid from retainer cavity 38 and the downward force exerted by biasing member 102. When the force exerted by biasing member 102 is greater than the force exerted by the pressurized fluid of retainer cavity 38, isolation valve 98 is kept closed and exhaust passageway 108 is opened. As the upward force is increased, the downward force of biasing member 102 is overcome and the pressurized fluid may be directed through isolation valve 98 to exhaust chamber 104. The pressurized fluid supplied to exhaust chamber 104 exerts a downward force on diaphragm 106, thereby closing exhaust passageway 110. The pressurized fluid is "bottled" or retained in exhaust chamber 104. A pressure differential is established between the downward force of the pressurized fluid in exhaust chamber 104 and the upward force of the pressurized fluid from brake cylinder 34. As the pressurized fluid in exhaust chamber 104 is reduced, the upward force of the pressurized fluid from brake cylinder 34 pushes upward on diaphragm 106 and opens exhaust passageway 110. This allows a certain amount of pressurized air from brake cylinder 34 to exhaust to atmosphere.

While various embodiments of automatic retainer valve 2 were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The disclosure described hereinabove is defined by the appended claims and all changes to the invention that fall within the meaning and the range of equivalency of the claims are to be embraced within their scope.

The invention claimed is:

1. An automatic retainer valve, comprising:
a body defining a piston passageway and at least one piston positioned within the piston passageway;
a brake pipe and reference volume in fluid communication with a first end of the valve;
a brake cylinder in fluid communication with a second end of the valve; and
an exhaust port defined in the body and positioned between the first and second ends of the valve,
wherein pressurized fluid is vented from the brake cylinder via the exhaust port upon a brake cylinder pressure exceeding a reference volume pressure,
wherein the brake cylinder pressure pushes the at least one piston towards the first end of the valve until the brake cylinder pressure equalizes with the reference volume pressure, and
wherein the reference volume is filled with pressurized fluid via the brake cylinder.

2. The automatic retainer valve as claimed in claim 1, further comprising a biasing member positioned in the second end of the valve, wherein the biasing member is biased towards the first end of the valve.

3. The automatic retainer valve as claimed in claim 2, wherein the biasing member is a spring.

4. The automatic retainer valve as claimed in claim 1, wherein the reference volume is isolated from the brake pipe upon the brake cylinder becoming fully-pressurized with pressurized fluid.

5. The automatic retainer valve as claimed in claim 1, wherein the reference volume is reset upon a full release of brake pipe pressure.

6. The automatic retainer valve as claimed in claim 5, wherein, after a full release of the brake pipe pressure, the brake pipe pressure is brought to a minimum application pressure.

7. The automatic retainer valve as claimed in claim 1, wherein the brake pipe is also in fluid communication with the brake cylinder, and wherein brake pipe pressure is used to maintain a maximum brake cylinder pressure.

8. The automatic retainer valve as claimed in claim 1, wherein the brake cylinder is fully vented upon the brake pipe pressure increasing to within a predetermined pressure relative to the reference volume pressure.

9. The automatic retainer valve as claimed in claim 8, wherein the pre-determined pressure is 3 psi.

10. An automatic retainer valve arrangement, comprising:
an automatic retainer valve comprising:
a body defining a piston passageway and at least one piston positioned within the piston passageway; and
an exhaust port defined in the body and positioned between the first and second ends of the valve;
a reference volume in fluid communication with a first end of the automatic retainer valve;
a brake pipe in fluid communication with the first end of the automatic retainer valve;
a brake cylinder in fluid communication with a second end of the automatic retainer valve;
a retainer cavity in fluid communication with the automatic retainer valve; and
an isolation valve in fluid communication with the retainer cavity and the brake cylinder,
wherein pressurized fluid is vented from the automatic retainer valve via the exhaust port upon a brake cylinder pressure exceeding a reference volume pressure, and
wherein the brake cylinder pressure pushes the at least one piston towards the first end of the valve until the brake cylinder pressure equalizes with the reference volume pressure.

11. The automatic retainer valve arrangement as claimed in claim 10, further comprising a first check valve positioned in fluid communication with the retainer cavity and the brake cylinder.

12. The automatic retainer valve arrangement as claimed in claim 10, further comprising a biasing member positioned in the second end of the valve, wherein the biasing member is biased towards a first end of the valve.

13. The automatic retainer valve arrangement as claimed in claim 12, wherein the biasing member is a spring.

14. The automatic retainer valve arrangement as claimed in claim 10, wherein the reference volume is isolated from the brake pipe upon the brake cylinder becoming fully-pressurized with pressurized fluid, and wherein the isolation valve is closed off by the pressurized fluid of the brake cylinder.

15. The automatic retainer valve arrangement as claimed in claim 14, wherein a pressure differential is established in the isolation valve between pressurized fluid exhausted from the retainer cavity and a biasing member, and wherein the pressurized fluid exhausted from the retainer cavity is retained in the isolation valve until the pressurized fluid exhausted from the retainer cavity exceeds a force greater than the force exerted by the biasing member.

16. The automatic retainer valve arrangement as claimed in claim 10, wherein the brake pipe is also in fluid communication with the brake cylinder, and wherein brake pipe pressure is used to maintain a maximum brake cylinder pressure.

17. The automatic retainer valve arrangement as claimed in claim 10, further comprising a second check valve positioned in line between the brake cylinder and the retainer cavity.

18. A method of automatically retaining pressurized fluid in a railway vehicle, comprising the steps of:
  a) providing an automatic retainer valve arrangement, comprising:
    an automatic retainer valve in fluid communication with a brake cylinder;
    a retainer cavity in fluid communication with the automatic retainer valve; and
    an isolation valve in fluid communication with the retainer cavity;
  b) filling the brake cylinder with pressurized fluid;
  c) venting pressurized fluid from the automatic retainer via the exhaust port upon a brake cylinder pressure exceeding a reference volume pressure in the automatic retainer; and
  d) retaining the exhausted pressurized fluid from the automatic retainer valve in the retainer cavity.

19. The method of automatically retaining pressurized fluid as claimed in claim 18, further comprising the steps of:
  e) providing a check valve positioned in line between the retainer cavity and the brake cylinder; and
  f) directing the exhausted pressurized fluid from the automatic retainer valve to the brake cylinder via the retainer cavity and check valve.

* * * * *

UNITED STATES PATENT AND TRADEMARK OFFICE
CERTIFICATE OF CORRECTION

| | | |
|---|---|---|
| PATENT NO. | : 10,059,320 B2 | Page 1 of 1 |
| APPLICATION NO. | : 15/414783 | |
| DATED | : August 28, 2018 | |
| INVENTOR(S) | : William John Potter et al. | |

It is certified that error appears in the above-identified patent and that said Letters Patent is hereby corrected as shown below:

In the Claims

Column 10, Line 39, Claim 9, delete "pre-determined" and insert -- predetermined --

Signed and Sealed this
Twentieth Day of November, 2018

Andrei Iancu
*Director of the United States Patent and Trademark Office*